April 17, 1956
K. WAGNER
2,742,330
BEARING FOR BALANCE BEAMS CAPABLE OF
SWINGING IN ALL DIRECTIONS
Filed May 12, 1953
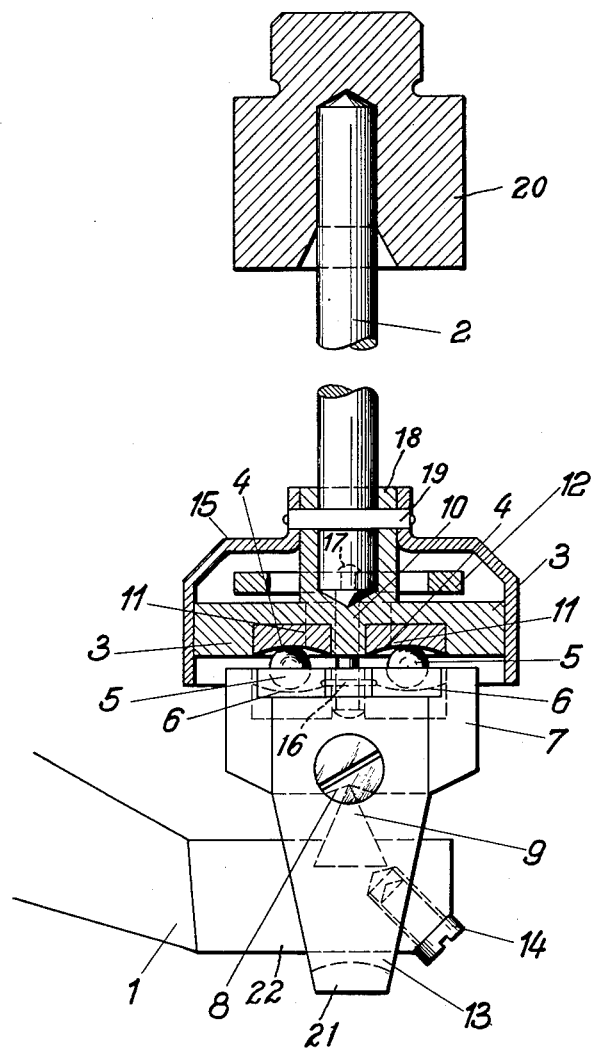
Inventor:
KURT WAGNER United States Patent Office 2,742,330
Patented Apr. 17, 1956

2,742,330

BEARING FOR BALANCE BEAMS CAPABLE OF SWINGING IN ALL DIRECTIONS

Kurt Wagner, Ebingen, Wurttemberg, Germany, assignor to August Sauter K. G., Ebingen, Germany Application May 12, 1953, Serial No. 354,544

Claims priority, application Germany May 21, 1952

5 Claims. (Cl. 308—2)

Balance beams are already known which rest on the knife edges of the load lever by way of pans and are mounted so as to be capable of swinging in all directions, in order thus to enable the beam to yield to lateral impacts to conserve the load carrying knife edges.

The invention concerns such a bearing in which the structural height is small and the beam loading is transmitted to the pans by means of balls which permit the beam to swing out. The balls are at any time disposed between ball pans, which are installed in plate-like mutually facing surfaces of the pan carrier or the beam support as the case may be.

The known bearings of this kind consist of more or less heavy individual parts which are built up together or separately from one another. Moreover, it can happen with these that the balls fall out of the bearing unintentionally when the beam is raised.

According to the invention these disadvantages are now removed in that each bearing carrier, the balls and the therewith associated beam supports are constructed as an independent constructional element which is self-contained, which can be installed or removed as a unit.

The drawing shows partly in a medial longitudinal section, partly in a side elevation an embodiment of the mounting in accordance with the invention, as is applicable for the support of any of the four corners of the balance beam.

1 is the end of a load lever and 2 a beam support. The beam supports 2 carry a plate 3, the underside of which is provided with ball pans 4. The plate 3 with the pans 4 rests on balls 5, which in turn are supported in pans 6 of the carrier 7 of the load pan 8, which bears upon the load knife edges 9 of the load lever 1. The ball pans 4 and 6 are formed in the shape of flattened domes, so that the plate 3 is laterally slidable relative to the carrier 7.

The pairs of ball pans 4 and 6, respectively, of the plate 3 and the load pan carrier 7 are associated with a pin 10, the carrier 7 maintaining a definite maximum spacing from the pin 10 with which it is connected by a pin 16, said pin 10 passing at a clearance through a vertical boring or opening 11 of the plate 3 and being secured on the other side of the same, e. g. by means of a member 12 or the like connected to the upper end of the pin 10 by means of a rivet 17. The support 2 is connected with the extension 18 of the plate 3 by a preferably removable pin 19 which also connects the support 2 with the protecting cap 15 mentioned hereinafter.

In operation, the carrier 7, the plate 3, and the support 2 form a unit, and the maximum possible clearance or distance between the plate 3 and the carrier 7 is chosen so that the balls 5 cannot fall out of the ball pans 4, 6.

In order to prevent the load pan 8 from leaving the load knife edges 9 and not returning thereto afterwards, when the balance beam 20 is raised, the pan carrier 7 is provided with a stirrup 13 which engages with the lower part 21 thereof the end 22 of the load lever 1, any release of the part 21 from the lever end 22 being prevented by a releasable stop or abutment, e. g. in the form of a screw 14 provided in the end 22 of the load lever 1.

In order to protect the mounting both from damage and from infiltration of dust or the like, each beam support 2 carries the protecting cap 15 mentioned hereinabove and extending downwards as far as beneath the upper surface of the pan carrier 7 with the ball pans 6 and enclosing the swinging bearing formed by the same. The protecting cap 15 is held in position by the removable pin 19 mentioned hereinabove.

I claim:

1. In a balance, in combination, a load lever having a knife edge, a carrier having a load pan being in engagement with said knife edge of said load lever, a pair of first ball pans arranged on said carrier oppositely to said load pan, a pair of balls arranged, respectively, in said first ball pans of said carrier, a member having a pair of second ball pans being in engagement, respectively, with said balls opposite to said first ball pans, and a beam support connected to said member, said beam support forming with said carrier, said member, and said balls a self-contained independent structural bearing unit capable of swinging in all directions and of being taken out as a whole from the balance.

2. A balance as claimed in claim 1, a pin extending at a clearance through a vertical boring of said member, means for connecting said pin to said carrier, and means connected to said pin above said member for securing said pin in position so as to limit the distance between said carrier and said member to an amount preventing said balls from falling out of said ball pans.

3. A balance as claimed in claim 1, and a removable protecting cap enclosing at least said member, said ball pans, said balls, and the upper portion of said carrier so as to protect the same against damage and moisture.

4. A balance as claimed in claim 1, and a part connected with said carrier, said part embracing one end of said load lever and preventing said load pan from leaving said knife edge.

5. A balance as claimed in claim 4, and a releasable stop provided in said end of said load lever and preventing any release of said embracing part from said end of said load lever.

References Cited in the file of this patent

UNITED STATES PATENTS

| Re. 13,816 | Deister | Oct. 27, 1914 |
| 1,167,311 | Moore et al. | Jan. 4, 1916 |
| 2,200,141 | Wirth | May 7, 1940 |
| 2,611,606 | Hadley | Sept. 23, 1952 |